United States Patent Office 3,776,889
Patented Dec. 4, 1973

3,776,889

ALLYL CARBAMATE ESTERS OF HYDROXY-CONTAINING POLYMERS

Kailash C. Pande, Farmingdale, and Stanley E. Kallenbach, Roslyn Heights, N.Y., assignors to Powers Chemco, Inc., Glen Cove, N.Y.

No Drawing. Filed Jan. 7, 1971, Ser. No. 104,807
Int. Cl. C08f *27/10;* C08g *22/06, 22/10*
U.S. Cl. 260—77.5 CR 3 Claims

ABSTRACT OF THE DISCLOSURE

Light-sensitive film forming polymers are disclosed which comprise recurring units of allyl carbamate-esterified polymeric alcohols. The use of these photosensitive materials in photolithography and photomechanical processes is also described.

BACKGROUND OF THE INVENTION

This invention relates generally to new photopolymers for use in photolithography and photomechanical processes and, more particularly, to light-sensitive organic solvent soluble film forming polymers capable of forming a continuous coating on a base consisting of allyl carbamate-esterified polymers.

For many years, photomechanical reproduction has depended primarily upon the use of a colloidal layer of gum arabic or other similar material containing a photosensitive hardening agent such as a bichromate salt. More recently, the use of light sensitive diazo compounds has resulted in the manufacture of pre-sensitized plates, i.e., plates to which the light sensitizing agent may be applied prior to actual use. The bichromated colloids and the diazo compounds, however, have several material disadvantages which restrict their application and use.

One such inherent disadvantage of the diazo compounds, for example, is their tendency to decompose chemically upon contact with a metal surface. Consequently, when a diazo compound is to be used over a metal plate, an intervening protective sublayer must be used. If the sublayer is not properly formed, the resulting lithographic plate may be defective or have a short storage life.

Bichromated colloids deteriorate relatively rapidly after coating thus making them unsuitable for use when long shelf life is desired. Moreover, many of the colloidal light sensitive materials presently employed as resists for etching require a relatively high temperature oven bake prior to use, thereby increasing the cost and complicating the process of preparation.

It has now been found that hydroxy-containing polymers having the following structural backbones may be synthetically modified to provide the novel polymers of this invention:

(a)

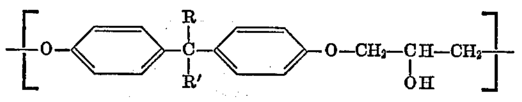

wherein R and R′ are each H or alkyl of 1 to 4 carbons;

(b)

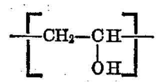

(c)

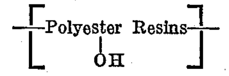

(d)

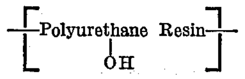

and (e) shellac

The above illustrated polymers are esterified with allyl isocyanate to yield the desired allyl carbamate ester of the hydroxy-containing polymers found to be advantageous light-sensitive materials in photolithography and photomechanical processes. Other hydroxyl-containing film-forming polymers may also be used.

SUMMARY OF THE INVENTION

Accordingly, this invention discloses and claims a light-sensitive organic solvent soluble film forming polymer capable of forming a continuous coating on a base which comprises an allyl carbamate ester of a hydroxy-containing polymer, said hydroxy-containing polymer having a molecular weight of from 500 to 115,000 and esterified to the extent of at least 60%.

Particularly preferred polymers are those having the structures:

(f)

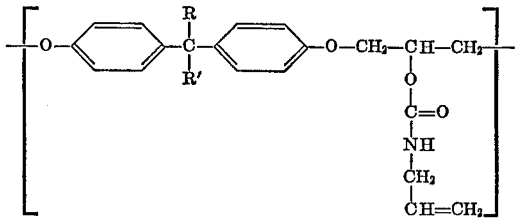

wherein R and R′ are each hydrogen or alkyl containing from 1 to 4 carbon atoms; preferably methyl groups. These polymers will have pendant carbamate (urethane) linkages.

(g)

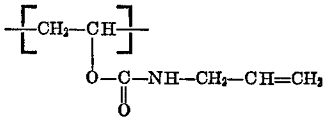

(h)

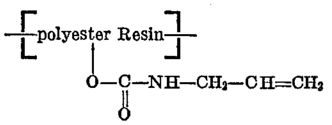

(i)

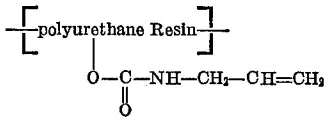

(j)

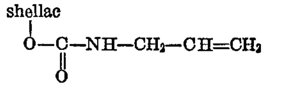

A preferred embodiment of this invention is a polymer as defined above in which the hydroxy-containing polymer is esterified to the extent of at least 60% and preferably, more than 80%.

Another preferred embodiment relates to allyl carbamate esterified polymers in which less than 40% of said allyl carbamate ester groups are replaced by benzoate substituents.

Still another preferred embodiment of this invention relates to the combination of the above polymers with a sensitizing agent, such as a cyclic compound which contains one or more carbonyl groups.

Another preferred embodiment of the present invention relates to a process for producing photographic resist images by the photochemical cross-linking of a polymeric material which comprises exposing a photographci element to actinic light through a process transparency wherein said photographic element comprises a support or substrate having thereon a photosensitive layer comprising a polymer as previously described whereby in the exposed areas said polymeric material is cross-linked to the insoluble state and after removal of the soluble photosensitive material in the unexposed areas, results in a photographic resist image.

It is the purpose of this invention to provide a new class of film forming polymers which are sensitive to light. These polymers are effectively used in the preparation of photographic resist materials, printing plates for lithography, etc.

DETAILED DESCRIPTION OF THE INVENTION

The herein described polymers are prepared by an esterification procedure whereby a polymeric hydroxy-containing alcohol is esterified with allyl isocyanate.

Another method is to esterify benzoic acid onto a portion of the hydroxy group followed by reaction of the remaining —OH groups with allyl isocyanate. This latter procedure is carried out to provide products which contain both allyl carbamate ester groups and benzoate substituents.

The polymeric alcohol starting materials are categorized into five groups simply for the sake of convenience. They are phenoxy resins of structure (a) shown above; polyvinyl alcohol as shown by structure (b); polyesters (c); polyurethane resins (d) and shellac (e).

These materials are easily prepared applying well-documented synthetic procedures or are available on a commercial scale.

For instance, phenoxy resin PKHH, a trademarked product of Union Carbide, is a typical example of material (a). Phenoxy resin of this structure are generally formed by copolymerization of bisphenol A and epichlorohydrin. The resulting compound will normally have secondary hydroxy groups, however, primary hydroxy groups may also arise if the epoxide ring opens on the other side. These resins usually have a molecular weight of at least about 20,000, generally 20,000 to 30,000 and may be even higher if desirable to produce a tougher film and one with greater insolubility after exposure to an actinic light source.

The second type of polymer is polyvinyl alcohol. Polyvinyl alcohol having a molecular weight of from 14,000 to 115,000 is preferred, and most preferred is a polyvinyl alcohol resin having a molecular weight of about 86,000. Polyvinyl alcohol within the aforesaid molecular weight range is commercially available.

The third type of polymer starting material applicable for purposes of this invention are polyesters. For purposes of this invention, it contemplates products which are obtained from the reaction with polyfunctional alcohol. Typical examples of dibasic acids or anhydrides thereof include maleic, fumaric, adipic and phthalic. Illustrative of suitable alcohols include ethylene glycol, propylene glycol, glycerol and citric acid. These materials can vary widely in molecular weights depending on the manner in which they are synthesized. However, for use herein, they must exhibit molecular weights in the range from 1500 to 115,000.

The remaining types of hydroxyl-containing polymers include cellulose, shellac and polyurethane resins. Cellulose is a hydroxyl-containing polysaccharide having 3 hydroxyl substituents per cellulose unit. Shellac, molecular weight of 500 to 2500, contains sufficient hydroxyl groups to be useful for purposes of this invention.

Polyurethane polymers exist commercially having free hydroxyl groups that can be reacted with allyl isocyanate.

Polyurethane resins are obtained from the reaction of diisocyanates, such as tolylene diisocyanate, with polyols, for instance, propylene glycol. The pendant hydroxy groups may arise due to the alcohol reagent having three or more hydroxyl groups or from the stoichiometry of the reaction, i.e., by using a molecular excess of alcohol reagent resulting in a polymer containing terminal hydroxy groups.

The above described hydroxy-containing polymers can be converted to the corresponding allyl carbamate esters by reacting the polymer with allyl isocyanate. A preferred manner of effecting this reaction makes use of a basic catalyst such as triethylamine, hexamethylene diamine, pyridine, etc. and a suitable solvent.

A typical procedure is as follows: The hydroxy-containing polymer is dissolved in a solvent such as N-methyl-2-pyrrolidone or methyl ethyl ketone and subsequently treated with allyl isocyanate. At the same time, a basic catalyst such as triethylamine is added when the reaction is run in nonbasic solvent. The resulting mixture is then heated at elevated temperatures, usually not higher than 100° C., for a period of ¼ to 3 hours.

Any solvent is applicable so long as it does not react with starting reagents or final products. Illustrative of operable solvents are: hydrocarbons, chlorinated hydrocarbons, ethers, etc.

The reaction work-up is typical for polymer isolation: a solvent such as acetone is highly effective in dissolving small amounts of organic impurities and is added for that purpose. Other solvents may serve in that capacity as well. The entire mixture after dilution with acetone is then poured into a large volume of water. The actual amount is not critical and will generally be about four times the volume of the reaction mixture. An excess is used simply to insure the complete precipitation of desired product.

A different work-up method comprises the addition of an organic solvent which causes the polymer product to precipitate. The product is then removed by filtration. Still another possible procedure comprises the utilization of a co-solvent system as the reaction solvent. The higher boiling solvent is incapable of solubilizing the product polymer so that as the other solvent is removed by evaporation, the product precipitates. It can then be isolated by filtration.

The polymeric materials within the purview of this invention are light-sensitive and are capable of being sensitized to increase their sensitivity to actinic rays. The photosensitive resist solution which consists of the above described polymers dissolved in a solution may be coated on a plate to become a printing member or other etched or plated surface and, after drying and exposure to actinic light, may be developed to remove the unexposed portions of the polymer by immersion in a suitable organic solvent. Thereafter, the plate may be etched or plated in a conventional manner.

Among the useful volatile organic solvents which contain the polymers described herein include: 1,4-dioxane, methylglycol esters, nitromethane, ethylene dichloride, butyrolactone, diglycol esters, chloroform, methylethyl ketone and other organic non-reactive solvents. Many of these same solvents may also be used as a developer.

The sensitizer which can be added to the polymer containing solution contains one or more carbonyl groups. Representative examples include:

4-methyl benzophenone
4,4′-bis-dimethylamino benzophenone
4,4′-bis-diethylamino benzophenone
bis-p-methylstyryl ketone
4-methylumbelliferone
2-methyl-1,4-naphthoquinone
N-methyl-2-quinolone
2-nitrofluorene
3-(2-furyl)acrylophenone
2-furaldoxime
Cholesteryl crotonate
1,2-naphthoquinone
5-phenyl-2,4-pentadienophenone
Benzanthracene-7-12-dione
Benzanthracene-7-one
Benzil
Benzophenone These sensitizers are generally added in amounts of 2.5% to 10% by weight based on the weight of the photosensitive polymer.

The sensitizer may be applied either in solution with the polymer or separately from a suitable solvent over the photopolymer after it has been applied to a support member. It is preferable, however, that the sensitizing agent be applied in a solution with the polymer.

In order to regulate or control the degree of cross-linking and/or to stabilize the photosensitive polymer over a period of time, an inhibitor may be added. Typical inhibitors include: hydroquinone, m-methoxyphenol, p-methoxyphenol, guaicol, chloranil and 4-t-butylcatechol.

This invention is also concerned with the formation of plates and films derived from the photosensitive mixture of the herein subject polymers and sensitizing agent. The process used makes possible the formation of coated printing films on any substrate by the deposition of the photosensitive mixture using well-known techniques. Typical substrates include metal sheets, e.g., copper, aluminum, zinc, etc., glass, cellulose, ester film, polyvinyl acetal film, polystyrene film, polyethylene terephthalate film, etc.

When the support material carrying the photosensitive composition is light-reflecting, there may be present, e.g., superposed on said support and adherent thereto or in the surface thereof, a layer or stratum absorptive of actinic light such as to minimize reflectance from the combined support of incident actinic light.

The plates formed wholly of or coated with the photosensitive composition are useful in photography, photomechanical reproductions, lithography and intaglio printing. More specific examples of such uses are offset printing, silk screen printing, duplicating pads, manifold stencil sheeting coatings, lithographic plates, relief plates and gravure plates. The term "printing plates" as used in the claims is inclusive of all of these.

They are also of great value in the printed circuit industry, as etching and electroplating resists and for defining integrated circuit images. Other uses are for chemical machining and for nameplate processes, where metals are removed by etching according to the photographic resist image.

Example I

Polyvinyl alcohol, mol. wt. 86,000 (4.4 g.) is dissolved in N-methyl-2-pyrrolidone (100 ml.) and to this solution is added allyl isocyanate (8.5 g.). The reaction mixture is heated at 75° C. for ½ hour, cooled, diluted with acetone (500 ml.) and poured into a large volume of water. The precipitated product is filtered, water washed and air dried. I.R. analysis confirms the presence of carbamate groups.

When a polyvinyl alcohol of molecular weight approximately 115,000 is used in the above process, a comparable product is obtained.

Example II

Polyester Resin No. 1979[1] (15 g.) (mol. wt. about 2000) is dissolved in methylethyl ketone (50 ml.) and to this solution is added allyl isocyanate (7.5 g.) and triethylamine (0.5 ml.). The reaction mixture is heated at 80° C. for ½ hour, cooled, diluted with cyclohexane (500 ml.) and the precipitated product is filtered, water washed and air dried. Good yields of product are obtained.

A polyester (mol. wt. approx. 1500) prepared by fusing a mixture of phthalic anhydride, maleic anhydride and propylene glycol at 200° C., under a $N_2$ blanket, is used in place of K 1979 in the aforedescribed procedure to yield a corresponding product.

Example III

Phenoxy Resin PKHH,[2] approximate mol. wt. 25,000 (5.0 g.), is dissolved in a mixture of xylene (25 ml.) and methylethyl ketone (65 ml.), and to this solution is added allyl isocyanate (2.5 g.) and triethylamine (0.5 ml.). The reaction mixture is heated at 80° C. for 1 hour, cooled, subjected to reduced pressure to remove solvent, diluted with methylethyl ketone (600 ml.) and poured into a large volume of water. The precipitated product is filtered, water washed and air dried. Good yields of product are obtained.

Example IV

Polyvinyl benzoate-allyl carbamate polymer.—Benzoyl chloride (0.5 M) is added to a solution of polyvinyl alcohol (1 M) and N-methyl-2-pyrrolidone (1 l.). The reaction mixture is heated at 80° C. for 4 hours, diluted with acetone (4000 ml.) and poured into a large volume of water. The precipitated polyvinyl benzoate half-ester is filtered, water washed and air dried. Saponification analysis shows 40% benzoate esterification.

To the above half-ester (0.25 M) dissolved in pyridine (400 ml.) is added allyl isocyanate (0.15 m) and the reaction mixture heated at 80° C. for ½ hour. After cooling, it is poured into a large volume of water, filtered, water washed and air dried to provide a substantial yield of product, polyvinyl benzoate-allyl carbamate.

Example V

Photochemical insolubilization.—The polymer prepared according to the procedure of Example II (0.75 g.) is dissolved in a mixture (1:1) of cyclohexanone and methylethyl ketone (10 ml.). To this is added Michler's ketone (0.05 g.) and benzophenone (0.05 g.). The resulting mixture is wiped onto a fine-grained lithographic plate, allowed to dry and exposed for 230 seconds to an 8000 watt pulsed Xenon lamp at a distance of 36 inches through a photographic film transparency.

The unexposed portions are dissolved away with a mixture of 25% methyl glycol ether acetate and 75% xylol. A clean image is produced having a printing speed approximately twice as fast as the standard diazo coating used for lithography.

A plate made by this process is attached to a lithographic press and run for 5000 impressions.

Example VI

The procedure of Example V is repeated except the polymer prepared according to the procedure of Example III is used instead. The mixture is coated onto a lithographic plate, exposed and developed as in Example V. A clean, scum-free image is obtained. The cross-linked polymer is highly ink receptive on a lithographic press.

Example VII

The procedure of Example V is repeated except the polymer prepared according to the method of Example I is used instead. Using ethanol to dissolve the unexposed portions provides an image having a printing speed about four times as fast as the standard diazo-type lithographic coatings.

Example VIII

The polymer prepared by the method of Example IV (0.75 g.) is dissolved in a mixture (1:1) of methyl glycol ether acetate and methylethyl ketone (10 ml.). To this solution is added benzil (0.1 g.), Michler's ketone (0.05 g.) and benzophenone (0.05 g.). A lithographic aluminum plate is coated with this solution using a wipe-on technique. It is exposed as in Example V and developed in a mixture of methyl glycol ether acetate and xylol to yield a clean, scum-free image. The printing speed of that image is approximately three times as fast as the standard lithographic diazo coating.

The coating is also used to produce printing plates by application of copper, magnesium and zinc photoengrav-

[1] A trademarked product of Lawter Chemical Co. having an OH number of 300.
[2] A trademarked phenoxy resin of Union Carbide.

ing metal. These are all satisfactorily etched in their respective acid baths to produce useful photoengraving.

Example IX

The procedure of Example VIII is repeated except the following sensitizers in equivalent amounts are used instead of the tri compound system of Example VIII with comparable results:

4-methyl benzophenone
4,4′-bis-dimethylamino benzophenone
4,4′-bis-diethylamino benzophenone
bis-p-methylstyryl ketone
4-methylumbelliferone
2-methyl-1,4-naphthoquinone
N-methyl-2-quinolone
2-nitrofluorene
3-(2-furyl)acrylophenone
2-furaldoxime
Cholesteryl crotonate
1,2-naphthoquinone
5-phenyl-2,4-pentadieneophenone
Benzanthracene-7-one

Example X

Shellac, M.W. 800 (10 g.) was suspended in hot (75° C.) methylethyl ketone (70 ml.). To this was added allylisocyanate (4.5 g.) followed by catalytic amounts (0.5 g.) of triethylamine. The reaction mixture was heated until a homogeneous solution was obtained. This homogeneous solution was maintained at 78° C. for another ½ hour. After cooling, it was poured into a large volume of cyclohexane, the insoluble portion was separated, washed with more cyclohexane and dried. This yielded the desired photopolymer.

Example XI

Copolymer (10 g.) of styrene and allyl alcohol (a commercially available product from Monsanto, trade name RJ 100) was dissolved in N-methyl-2-pyrrolidone (80 ml.). To this was added allylisocyanate (5 g.). The reaction mixture was heated at 80° C. for one hour. After cooling, it was poured into water. The insoluble portion was filtered, washed with water and dried to yield the final allylcarbamate polymer.

Example XII

A polyurethane polymer containing pendant, unreacted hydroxyl groups (10 g.) was dissolved in N-methyl-2-pyrrolidone (75 ml.). Allylisocyanate was added to this solution with stirring and the reaction mixture was heated at 80° C. for one hour. When poured into water, the polymer precipitated. It was then filtered, water washed and dried. This photopolymer was soluble in most common organic solvents. This was sensitized with benzil, coated onto a copper plate and exposed to a photographic film negative. It was developed in methylethyl ketone, washed and dried. The plate was then etched with $FeCl_3$.

What is claimed is:

1. A light-sensitive organic solvent soluble, film forming polymer capable of forming a continuous coating on a base which consists essentially of an allyl carbamyl ester of a hydroxy-containing polymer having recurring units of the structure:

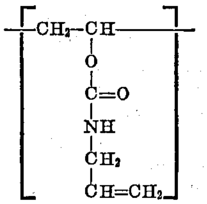

said hydroxy-containing polymer having a molecular weight of from 500 to 115,000.

2. A polymer as claimed in claim 1 which is esterified to the extent of at least 60%.

3. A polymer as claimed in claim 1 wherein less than 40% of said allyl carbamyl ester groups are replaced with benzoate substituents.

References Cited

UNITED STATES PATENTS

| | | | |
|---|---|---|---|
| 3,640,923 | 2/1972 | Guthrie | 260—13 |
| 3,645,982 | 2/1972 | Larsen | 260—77.5 BB |

JOSEPH L. SCHOFER, Primary Examiner

C. A. HENDERSON, Jr., Assistant Examiner

U.S. Cl. X.R.

96—35.1, 115; 204—159.14; 260—30.4, 31.4, 32.4, 32.8, 33.8, 77.5 AP, 77.5 A, 209 R